United States Patent
Wu et al.

(10) Patent No.: US 11,037,213 B2
(45) Date of Patent: Jun. 15, 2021

(54) EMBEDDING SECURITY INFORMATION IN AN IMAGE

(71) Applicant: Idemia Identity & Security USA LLC, Billerica, MA (US)

(72) Inventors: Yecheng Wu, Lexington, MA (US); Robert L. Jones, Andover, MA (US)

(73) Assignee: Idemia Identity & Security USA LLC, Billerica, MA (US)

(*) Notice: Subject to any disclaimer, the term of this patent is extended or adjusted under 35 U.S.C. 154(b) by 0 days.

(21) Appl. No.: 16/714,598

(22) Filed: Dec. 13, 2019

(65) Prior Publication Data

US 2020/0193495 A1 Jun. 18, 2020

Related U.S. Application Data

(63) Continuation of application No. 15/808,628, filed on Nov. 9, 2017, now abandoned.

(Continued)

(51) Int. Cl.
*G06K 9/00* (2006.01)
*G06Q 30/06* (2012.01)
(Continued)

(52) U.S. Cl.
CPC ..... *G06Q 30/0607* (2013.01); *G06K 9/00288* (2013.01); *G06Q 50/265* (2013.01); *G06T 7/60* (2013.01)

(58) Field of Classification Search
CPC .... G06Q 30/0607; G06Q 50/265; G06T 7/60; G06K 9/00288; G06K 9/00; G06K 9/202;
(Continued)

(56) References Cited

U.S. PATENT DOCUMENTS 4,479,145 A 10/1984 Azuma
4,547,895 A 10/1985 Mita
(Continued)

FOREIGN PATENT DOCUMENTS

EP 1432234 9/2011

OTHER PUBLICATIONS

Al-Hamami et al., "A new approach for authentication technique," Journal of Computer Science, 2005, 1(1):103-106, 4 pages.
(Continued)

*Primary Examiner* — Amir Alavi
(74) *Attorney, Agent, or Firm* — Fish & Richardson P.C.

(57) ABSTRACT

A method for producing an identification article is described. The method includes associating one or more data items with one or more line patterns, where the line patterns include one or more line segments. A particular data item is associated with at least a subset of line segments and the particular data item corresponds to an attribute of a user of the identification article. The method further includes integrating the line patterns with graphical features of the identification article. The graphical features being discernable by a human eye and the subset of line segments is indiscernible by the human eye. The method includes identifying a region of the identification article that includes the subset of line segments associated with the particular data item and associating the particular line pattern with an identifying feature of the user.

20 Claims, 7 Drawing Sheets

Related U.S. Application Data (60) Provisional application No. 62/419,776, filed on Nov. 9, 2016.

(51) Int. Cl.
*G06Q 50/26* (2012.01)
*G06T 7/60* (2017.01)

(58) Field of Classification Search
CPC ........ G06K 9/222; G06K 9/2011; G06K 9/72; H04N 7/50; H04N 7/30; H04N 7/26244; H04N 7/26313; H04N 7/26106
See application file for complete search history.

(56) References Cited

U.S. PATENT DOCUMENTS

| | | | |
|---|---|---|---|
| 4,629,215 A | 12/1986 | Maurer | |
| 4,633,328 A | 12/1986 | Saito | |
| 4,719,450 A | 1/1988 | Yamauchi | |
| 5,410,642 A | 4/1995 | Hakamatsuka et al. | |
| 5,761,686 A | 6/1998 | Bloomberg | |
| 6,210,777 B1 | 4/2001 | Vermeulen et al. | |
| 6,843,422 B2* | 1/2005 | Jones | B23C 5/10 235/380 |
| 7,043,052 B2 | 5/2006 | Rhoads | |
| 7,207,494 B2* | 4/2007 | Theodossiou | B41M 3/14 235/487 |
| 7,277,891 B2* | 10/2007 | Howard | G06K 9/00006 707/707 |
| 7,593,542 B2* | 9/2009 | Abe | G06T 1/0092 358/1.14 |
| 7,706,565 B2* | 4/2010 | Levy | G06K 19/06046 382/100 |
| 7,789,311 B2 | 9/2010 | Jones | |
| 7,804,982 B2* | 9/2010 | Howard | G07C 9/253 382/115 |
| 7,824,029 B2* | 11/2010 | Jones | B41J 13/12 347/101 |
| 7,974,877 B2* | 7/2011 | Ramanathan | G06Q 30/0255 705/14.55 |
| 8,054,509 B2* | 11/2011 | Saka | H04N 1/3875 358/3.28 |
| 8,160,294 B2* | 4/2012 | Takahashi | H04N 1/32293 382/100 |
| 8,560,556 B2 | 10/2013 | Fitterer | |
| 8,783,580 B2 | 7/2014 | Lesur | |
| 9,246,741 B2 | 1/2016 | Eswaran et al. | |
| 9,390,460 B2 | 7/2016 | Caton et al. | |
| 9,906,360 B2 | 2/2018 | Johnson et al. | |
| 10,457,086 B2 | 10/2019 | Jones et al. | |
| 2002/0170966 A1 | 11/2002 | Hannigan et al. | |
| 2003/0116630 A1 | 6/2003 | Carey et al. | |
| 2004/0049401 A1 | 3/2004 | Carr et al. | |
| 2004/0250142 A1 | 12/2004 | Feyler | |
| 2005/0109850 A1 | 5/2005 | Jones | |
| 2006/0171558 A1 | 8/2006 | Alattar et al. | |
| 2008/0301464 A1 | 12/2008 | Parkinson | |
| 2010/0295289 A1 | 11/2010 | Doublet et al. | |
| 2011/0266348 A1 | 11/2011 | Denniston, Jr. | |
| 2011/0266349 A1* | 11/2011 | Bi | B23C 5/10 235/488 |
| 2013/0301870 A1 | 11/2013 | Mow et al. | |
| 2015/0151562 A1 | 6/2015 | Whiteman et al. | |
| 2016/0055368 A1 | 2/2016 | Cao | |
| 2018/0186167 A1 | 7/2018 | Jones et al. | |

OTHER PUBLICATIONS

International Search Report and Written Opinion in International Application No. PCT/US2017/069043, dated Mar. 1, 2018, 11 pages.
International Search Report and Written Opinion in International Application No. PCT/US2017/060926, dated Jan. 16, 2018, 8 pages.

* cited by examiner

EMBEDDING SECURITY INFORMATION IN AN IMAGE

CROSS REFERENCE TO RELATED APPLICATIONS

This application claims the benefit of U.S. Provisional Application No. 62/419,776, filed on Nov. 9, 2016, which is incorporated herein by reference in its entirety.

This application claims the benefit of U.S. application Ser. No. 15/808,628, filed on Nov. 9, 2017, which is incorporated herein by reference in its entirety.

FIELD

The present specification is related to physical and digital identifications.

BACKGROUND

User identifications such as driver licenses can be issued either as physical identification cards or digital identifications. A physical identification card is issued by creating a card that includes customer information, whereas a digital identification is issued in an electronic format and accessed on a client device. Both physical and digital identifications are commonly used for verifying the identity of an individual, providing access to restricted areas, or authorizing an individual to purchase age-restricted content.

SUMMARY

This specification describes methods for embedding security information in background line patterns of identification documents and provides methods to embed security information such as, for example, a person's name, date of birth, or identification number in the background line patterns of the document. The secure/sensitive information is encoded using line patterns that include variable line length and gap width between line segments. In some implementations, the encoded information can be machine-readable for identification document/article verification and authentication purposes.

In one innovative aspect of the specification, an identification article is provided, comprising a photographic image associated with a user of the identification article; and a graphical element comprising one or more line patterns, the line patterns including one more or line segments; wherein at least a portion of a line segment of a line pattern corresponds to binary data that can be interpreted by a processing unit of a computer. In some implementations, the identification article is one of a physical identification card or a digital identification item that is viewable on a display screen of a computing device.

In another innovative aspect of the specification, a method for producing an identification article is provided comprising associating one or more data items with one or more line patterns, wherein the line patterns include one or more line segments; and associating a particular data item with at least a portion of a line segment, the particular data item corresponding to an attribute of a user of the identification article. The method further includes integrating the one or more line patterns with graphical features of the identification article, the graphical features being discernable by a human eye; identifying a region or area of the identification article that includes the line segment associated with the particular data item; and associating the particular line pattern with an identifying feature of the user.

In some implementations, the identification article is one of a physical identification card or a digital identification item that is viewable on a display screen of a computing device. In one aspect of this implementation, the identifying feature corresponds to at least one data item of the one or more data items. In another aspect of this implementation, the identifying feature of the user is a photographic image of the face of the user.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, a system is capable of generating identifications that include distinctive line patterns corresponding to different portions of secure customer information. For example, the system may construct graphical elements of an identification, such as a customer photo, a background pattern, or a portion of text, using different line lengths, thicknesses and line spacing. The system can then associate each line pattern with a corresponding portion of secure customer information. The system can also place multiple line patterns in different regions or areas of the graphical elements within the identification.

The system can either verify the authenticity of an identification by determining the validity of the secure customer information associated with each line pattern, verifying the arrangement of the distinctive line patterns within the identification, or both. For instance, once the identification has been issued, the system can detect the embedded line patterns within the identification in order to identify corresponding secure customer information. The secure customer information can then be used to authenticate the customer.

A "customer" may refer to a user or individual. For example, a customer may be an individual with a physical identification card that may be a driver's license issued by a department of motor vehicles of a territory or a municipality. In other instances, the identification card may be other types of identifications such as a social security card, a passport, a birth certificate, or other government or company-issued identification cards.

A customer may be provided with a digital identification by enrolling into a digital identification program offered by a digital identification administrator. In some instances, the digital identification administrator may also be the issuing authority. In other instances, the digital identification administrator may be another organization that is authorized by the issuing authority to manage the issuance and maintenance of identification cards.

A customer may opt to enroll into the digital identification program using various methods such as, for example, an online enrollment process, a form submission, or through an oral agreement with an authorized representative. The digital identification administrator may then create a customer entry including customer information in a digital identification database. For instance, the customer information may include one or more of an email address, an identification number, a customer photograph, and other types of demographic information (e.g., home address) associated with the customer. The digital identification database may also indicate to the digital identification administrator that an entry for the customer has been successfully created once the entry for the customer has been created.

The enrollment process for the digital identification program may include the use of various methods to receive customer information, such as, for example, the use of email, the use of a customer token such as a personal identification number (PIN), and/or the use of customer biometric parameters.

Figure 1A:
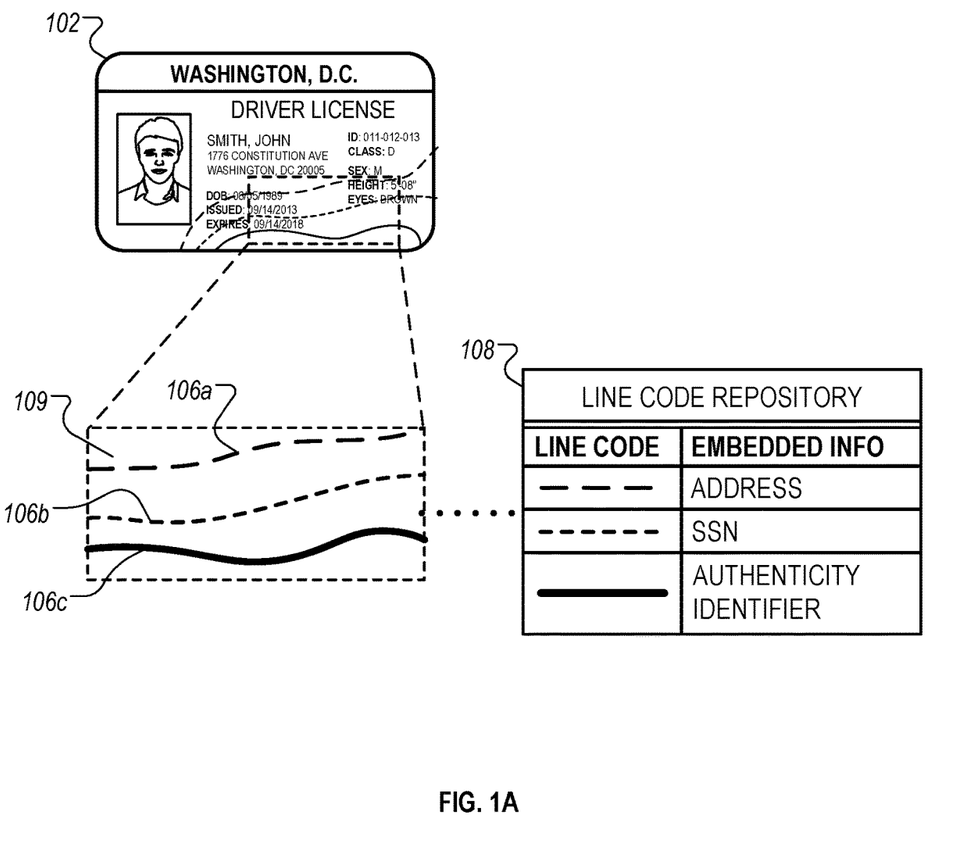
FIG. 1A illustrates an example of a physical identification with line patterns embedded within a photograph.

FIG. 1A illustrates an example of a physical identification with line patterns embedded within a certain region/area of the identification article. In the example, an identification 102 includes a customer photograph and embedded line patterns 106a, 106b, and 106c. Identification 102 is constructed such that different regions or areas of the identification article are outlined with different patterns. For example, line pattern 106a outlines a line pattern having a first spacing characteristic, line pattern 106b outlines a line pattern having a second spacing characteristic that differs from the first (i.e., smaller length), and line pattern 106c includes a solid line portion that can be used to indicate an authenticity identifier.

In some implementations, lines associated with a particular pre-print pattern can have certain line portions removed. The removed line portions therefore create an area/space 109 in which line segments associated with line code can be embedded. In some implementations, the line code can be configured in a curved manner that can be used to create outlines of particular patterns such as buildings, state capitals, state birds, or any other background pattern or image outline corresponding to a particular authority indicator/identifier for a given jurisdiction. In various embodiments, the line patterns are not used as part of the image data associated with the identification card but rather as means to securely embed encoded data that corresponds to one or more identifying features of the user/owner of the identification article.

Although the figure illustrates line patterns 106a-c being embedded within a physical identification, in other instances, the line patterns 106a-c can also be embedded within a digital identification (e.g., a digitally issued driver license). In addition, although the example depicted illustrates visibly detectable line patterns (e.g., visible to a human eye), in other instances, the line patterns can be constructed small enough to appear invisible to the human eye. In such instances, the line patterns can outline microfeatures of a customer photograph (or other portions of the identification 102).

Each of the line patterns 106a, 106b, and 106c are distinctive from one another based on their line attributes. Examples of line attributes include the spacing of line segments within a pattern line, the length of the pattern line, the color of the pattern line, among others. As described above, the line pattern is also associated with a portion of secure customer information. The secure customer information can be identified within a line pattern repository 108 that includes mappings between each line pattern and corresponding secure customer information. As depicted, the line pattern 106a is mapped to customer address, the line pattern 106b is mapped to a social security number, and the line pattern 106c is mapped to an authenticity identifier.

The detection of the line patterns 106a-c and associated secure customer information can be used to verify the authenticity of the identification 102. As an example, verification data for the identification 102 can specify the line patterns 106a-c, the arrangement of the line patterns 106a-c within identification 102, and/or the associated credential information included within the line pattern repository 108. In this example, a detector device (described below) may compare detection data obtained from an identification presented by a customer to the verification data for the identification 102. For instance, if the detector device fails to detect each of the line patterns 106a-c, or detects an incorrect arrangement of the line patterns 106a-c, then the detector device may determine that there may be likelihood that the presented identification may be fraudulent.

In another example, secure customer information obtained from the detected line patterns of a presented identification can be used to authenticate a customer in addition to the credential information specified by the identification (e.g., name, date of birth, address, etc.). In this example, line patterns can be included and/or embedded within the identification to securely authenticate a customer without exposing sensitive secure customer information that is not displayed on the identification 102 (e.g., social security number). In this regard, line pattern detection can be used to securely verify sensitive customer information.

Figure 1B:
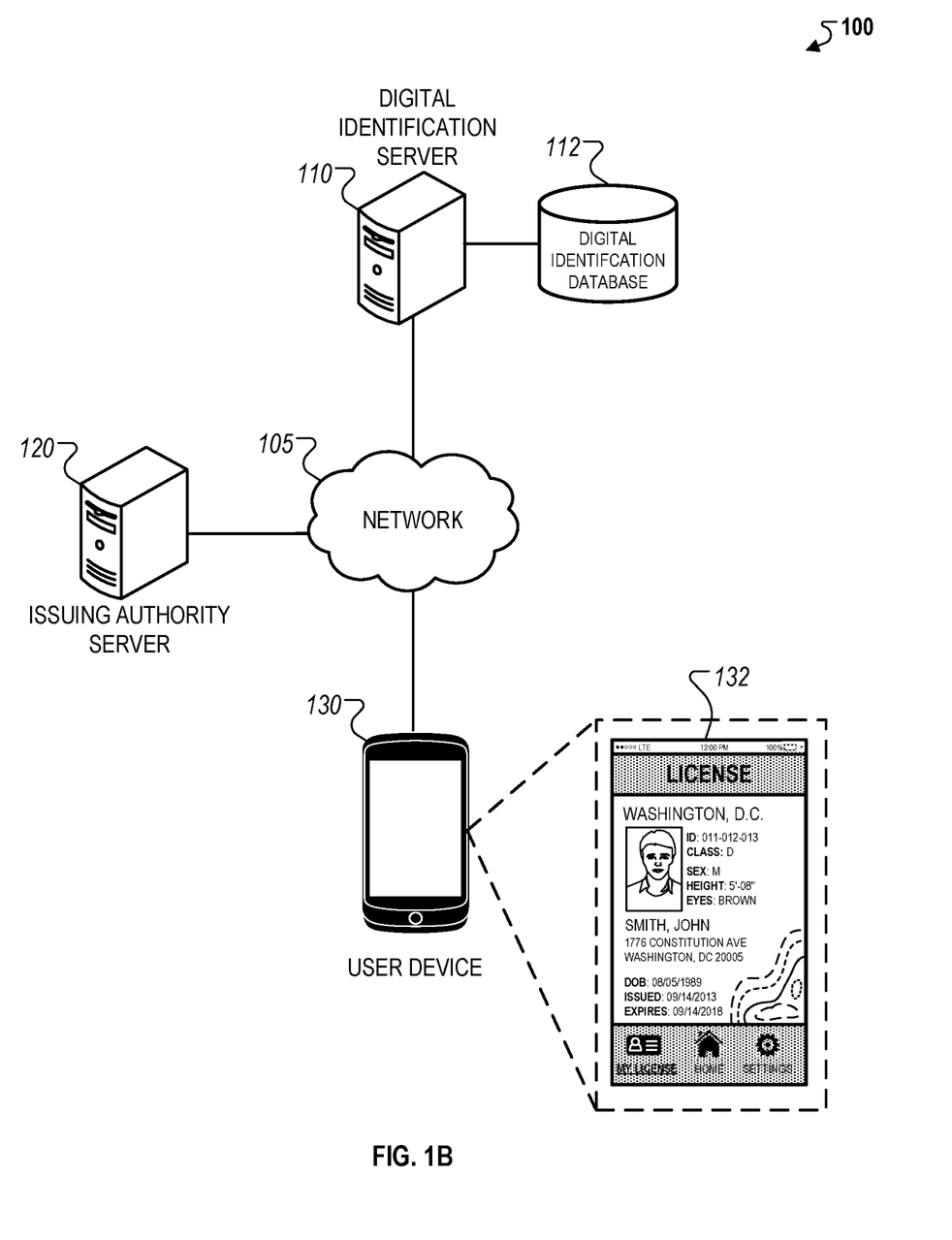
FIG. 1B illustrates an example of a system that generates digital identifications with embedded line patterns.

FIG. 1B illustrates an example of a system 100 for generating digital identifications that include line patterns for embedding data. In general, the system 100 may be used for various processes associated with a digital identification 132 (e.g., line pattern detection as described previously with respect to FIG. 1A). In addition, the system 100 may be used to initially enroll customers into a digital identification program, and provision a digital identification 132 to enrolled customers.

Briefly, the system 100 may include a digital identification server 110, an issuing authority server 120, and a customer device 130 connected over a network 105. The digital identification server 110 may also be configured to exchange communications with a digital identification database 112. In addition, the customer device 130 may display a digital identification 132 on a user interface presented to a customer (e.g., a customer or any other authorized user) on the customer device 130. Although the digital identification 132 is depicted as a digital driver license in FIG. 1B, the digital identification 132 may alternatively be a digital form of any physical identification card issued to a customer from various types of identification issuing authorities (e.g., a government agency or a company).

In general, the system 100 can be used to include line patterns within the digital identification 132 and/or assign portions of secure customer information to each of the line patterns included within the digital identification 132. As described above, the line patterns can be included to enable the system 100 to verify the authenticity of an identification presented by a customer and/or authenticate the customer based on extracting assigned credential information for each line segment.

For example, during an issuance process of the digital identification 132, the digital identification server 110 may initially generate one or more line segments to include within the newly generated digital identification 132. The digital identification server 110 may then obtain verified credential information stored within a customer record of the digital identification database 112 and associate portions of the verified credential information with each of the generated line segments. The verified credential information can include data collected and vetted by a government entity (e.g., department of motor vehicles).

Once the digital identification server 110 associates the line patterns with portions of the verified credential information, the digital identification server 110 may then generate a line pattern repository and store it within the digital identification database 112. The digital identification server 110 may also generate a new digital identification including designated line segments for issuance. After the digital identification 132 has been issued to the customer, the data included within stored line pattern repository can be used to identify the line patterns and/or the line pattern arrangement that is expected to be included within a verified copy of identification 132.

Additionally or alternatively, information contained within the line pattern repository can be used to generate time-variant representations of the digital identification 132. For example, the line pattern repository may specify a time-limited combination of line patterns included within the digital identification 132 and corresponding credential information for each line pattern. In such implementations, the line pattern combination may be periodically changed by the digital identification server 110 in order to increase the security of the digital identification 132. For example, if a customer transaction includes a digital identification with an expired line pattern combination (e.g., from a prior configuration), then the digital identifications server 110 may determine that the included digital identification may be a counterfeit identification.

Referring now to the individual components of the system 100, the network 105 may be configured to enable electronic communications between the digital identification server 110, the issuing authority server 120, and the customer device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any network capable of carrying electronic communications (e.g., data or voice communications). For example, the network 105 may include networks based on the Internet Protocol (IP), or other comparable technologies.

The digital identification server 110 may be a remote server that is monitored and operated by an organization or institution that is authorized by an identification issuing authority to provide the digital identification 132 to a customer. In some instances, the organization or institution operating the digital identification server 110 may be an organization that is designated by the identification issuing authority to access identification information for a plurality of customers who have been issued a physical identification card. In other instances, the organization or institution operating the digital identification server 110 may be the identification issuing authority (e.g., a government institution) that issues a plurality of customers with a physical identification card.

The digital identification server 110 may coordinate and administer the backend processes that are involved in provisioning a digital identification to the plurality of customers that have been issued a physical identification from the identification issuing authority. For instance, the digital identification server 110 may initiate processes to enroll customers with the digital identification 132, and operate security protocols to detect potential fraudulent use or privacy breaches associated with the digital identifications. In some instances, the processes related to the digital identification 132, as described above, may be coordinated with the issuing authority server 120, to ensure that secure customer information that includes personally identifiable information are not exposed during the provisioning of the digital identification 132.

As described, secure customer information may refer to customer information within the digital identification 132 that may include personally identifiable information associated with the customer such as, for example, social security numbers, place of residence, and/or other demographic information that is associated with other types of information that the customer considers private. In addition, the secure customer information may include medical records of the customer that are protected under the Health Insurance Portability and Accountability Act of 1996 (HIPAA). Access to the secure customer information within the digital identification 132 may be restricted by associated the secure customer information to different line patterns and specifying the associations within the line pattern repository as described above.

The digital identification server 110 may exchange communications with the digital identification database 112, which includes customer information for enrolled customers and/or other configuration details related to the digital identification program. For instance, the digital identification database 112 may include a customer entry associated with a customer that includes account information associated with enrolled customers, and any type of customer information that may be provided by the customer during a digital identification enrollment process.

In some implementations, the digital identification database 112 may include customer entries for both customers that are enrolled in the digital identification program and potential customers that the digital identification server 110 has identified as customers that are likely to enroll in the digital identification program. For example, the digital identification database 112 may include a field that indicates whether a customer entry is associated with an enrolled customer or a potential customer. In such implementations, the digital identification database 112 may be accessed by the digital identification server 110 to retrieve customer information for the digital identification 132 associated with an enrolled customer, and customer information for a candidate customer in order to send an enrollment email that provides an enrollment code to the candidate customer.

In some implementations, the customer entry for enrolled customers may be automatically created by the digital identification server 110 within the digital identification database 112. In such implementations, the customer may submit an online enrollment form including a set of user fields for providing customer information. In response, the digital identification server 110 may initiate a computer-implemented procedure that automatically generates a customer entry for the customer in the digital identification database 112 and inserts the values submitted for the set of user fields as customer information that is included in the customer entry.

In some implementations, the digital identification server 110 may additionally exchange communications with an image server, which stores photographs associated with a customer identification card. In some implementations, the image server may be operated by a separate entity or organization that operates the digital identification server 110. For instance, in such implementations, the image server may be operated by the identification issuing authority. In other implementations, the image server may be operated by the authorized issuing authority that also operates the digital identification server 110. In such implementations, the image server may be a sub-component of the digital identification server 110.

The issuing authority server 120 may be a remote server that is operated by the issuing authority and used to control access to secure customer information that is included in physical identification cards issued by the issuing authority. For instance, the issuing authority server 120 may provide access to demographic information of customers, historical information associated with customers (e.g., previous identification cards issued, number of renewals, etc.), and/or other types of customer information using authorization procedures that require validation of access credentials. For example, upon receiving a request for the secure customer information by the digital identification server 110, the issuing authority server 120 may require an exchange of the access credentials to validate an authorized request.

The issuing authority server 120 may be queried by the digital identification server 110 for secure customer information during a digital identification operation. For instance, during an enrollment process, after a customer has opted to enroll into a digital identification program, the digital identification server 110 may query the issuing authority server 120 using a customer identifier number to extract secure customer information to be included in a generated digital identification 132. In another example, during a verification operation, the digital identification server 110 may access the issuing authority server 120 to determine whether a digital identification 132 for a customer includes false customer information indicative of a fraudulent digital identification 132.

In some implementations, the issuing authority server 120 may be configured with additional security protocols compared to the digital identification server 110 to protect sensitive customer information associated with the customer. For instance, in some instances, the issuing authority server 120 may be associated with a Federal government agency that manages nationwide programs that require specialized access (e.g., a government clearance). In such instances, the digital identification server 110 may be configured to access the secure customer information stored within the issuing authority server 120 under a special security agreement that ensures that the exchange of the secure customer information is controlled and regulated according to Federal privacy statutes. For example, the issuing authority server 120 may track information related to each exchange with the digital identification server 110 such that in the event that the digital identification server 110 determines that a particular digital identification 132 is invalid, a notification may be received by the issuing authority server 120 to take additional security measures to protect more sensitive customer information that may be associated with, but not included in, the digital identification 132. In this regard, the communication exchange between the digital identification server 110 and the issuing authority server 120 may be utilized to ensure protection of customer information beyond the customer information included in the digital identification 132.

The customer device 130 may be a portable electronic computing device that displays the digital identification 132 associated with a customer. For instance, the customer device 130 may be, for example, a smart phone, a tablet computer, a laptop computer, a personal digital assistant device, an electronic pad, a smart watch, a smart glass, or any electronic device with a display that is connected to a network.

The customer device 130 exchanges communications with the digital identification server 110 to receive and transmit enrollment information related to the digital identification program, customer data that is included in the digital identification, credential data used to verify the authenticity of the digital identification 132, and/or configuration settings that adjust the display of the digital identification 132 on the customer device 130. For example, during an online enrollment process, the customer may use the customer device 130 to input customer information and an assigned access code for the digital identification program, which is then transmitted to the digital identification server 110 to generate the digital identification 132. In another example, during a verification process, when the digital identification 132 is enabled on the customer device 130, a data packet including credential data may be transmitted to the digital identification server 110 to determine whether the digital identification 132 is still valid or includes accurate information. In this example, if the digital identification server 110 determines that the credential data is valid, then the digital identification may be determined to be valid. Alternatively, if the digital identification server 110 determines that the credential data is not valid, then the digital identification 132 may be determined to be invalid.

In some implementations, the customer device 130 may include a mobile application that exchanges communications to the digital identification server 110 as an application server. For example, the mobile application may be associated with a customer account that is stored on the digital identification database 112. In addition, the mobile application may periodically exchange information related to the security status assigned by the digital identification server 110 to determine whether the digital identification 132 is valid. In some instances, the mobile application may additionally or alternatively include various displays of the digital application such that the mobile application may be used as a replacement form of identification to a physical identification card.

The digital identification 132 may be displayed on a user interface on the customer device 130. For example, as shown in FIG. 1A, the digital identification 132 may include a photograph of a customer, a customer identifier, categorical data (e.g., identification classification), demographic information (e.g., sex, height, eye color, home address), date of birth, etc.), and issuance information associated with a corresponding physical identification card. In some instances, the digital identification may be a digital image of the corresponding physical identification card. In such implementations, the appearance of the digital identification may be substantially similar to the physical identification and consequently used as a duplicate form of identification.

Figure 2:
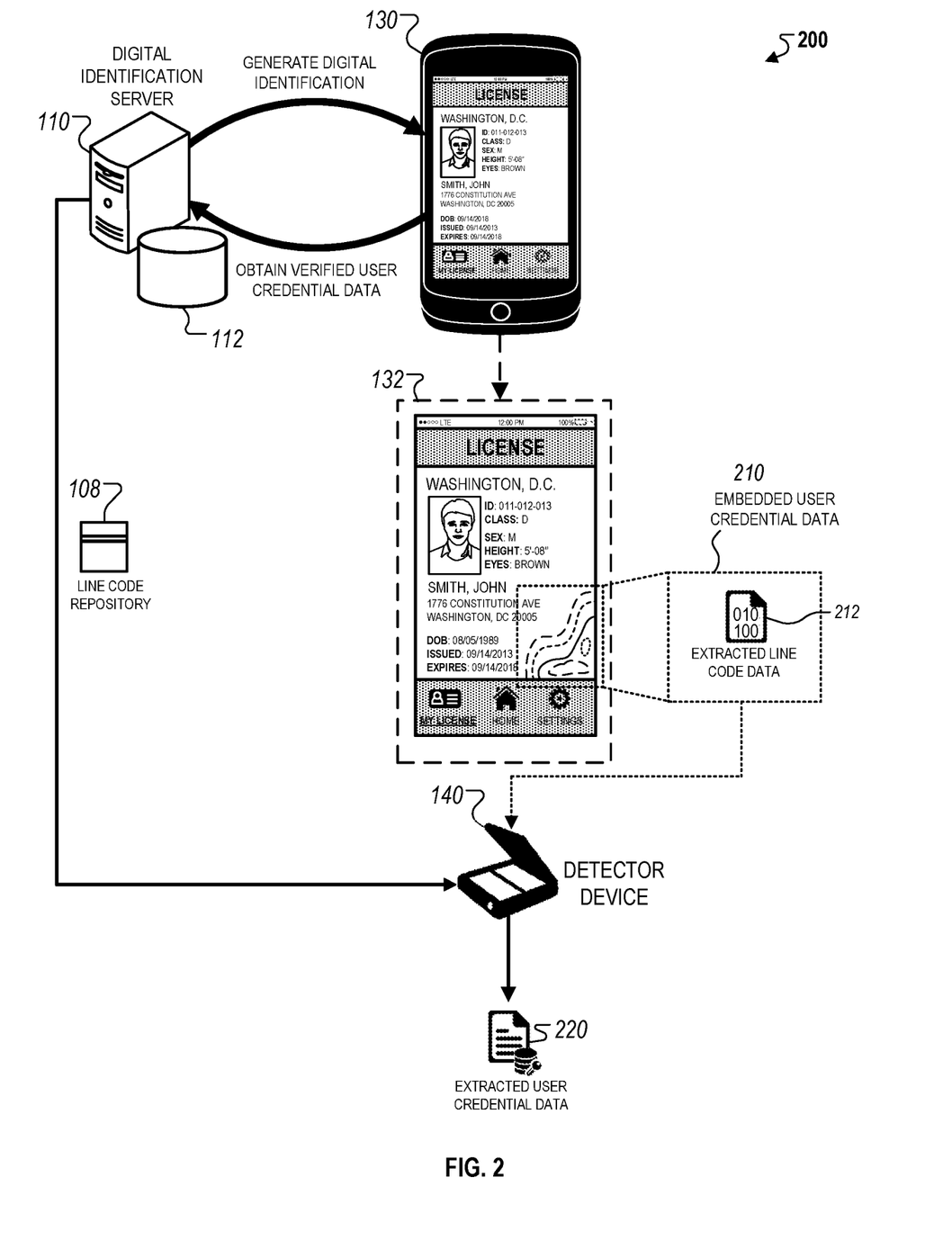
FIG. 2 illustrates an example of a system for verifying a digital identification based on data extracted from embedded line patterns of the digital identification.

FIG. 2 illustrates an example of a system 200 for verifying a digital identification based on data extracted from embedded line patterns of the digital identification 132. Although FIG. 2 illustrates a system that extracts data from a digital identification, similar systems and techniques can also be employed for a physical identification card such as the identification 102 depicted in FIG. 1A.

Digital identification server 110 initially obtains secure customer information using different techniques. In some instances, the secure customer information may be obtained during the enrollment process when the customer is requested to verify his identity by providing personally identifiable information (e.g., social security number, user authentication information, etc.). The obtained customer information can then be stored and associated with designated line patterns. Additionally or alternatively, the secure customer information can also be obtained from an electronic database of a verified source such as the issuing authority. For example, during the enrollment process for obtaining a digital driver license, the digital identification server 110 may obtain secure customer information associated with a customer record within the state department of motor vehicle database. In this example, the secure customer information can represent vehicle identification numbers that are currently registered with the customer record, among other types of personally identifiable information.

Digital identification server 110 then generates the digital identification 132 for a customer of the customer device 130 based on the obtained secure customer information. For example, the digital identification server 110 includes a modified graphical element embedding line patterns into the digital identification 132. An example of the modified graphical element is the customer photograph illustrated in FIG. 1A. The digital identification 132 is then issued and accessible by the customer on the customer device 130.

Once digital identification 132 is generated, the digital identification server 132 also generates the line pattern repository 108 illustrated in FIG. 1A. As discussed above, the line pattern repository 108 maps specific line patterns that are embedded within the digital identification 132 to pieces of secure information obtained by the digital identification server 110 during the generation of the digital identification server 110. The line pattern repository 108 thus enables the identification of a corresponding piece of secure customer information based upon the detection of an embedded line pattern within the digital identification 132. The line pattern repository 108 may be stored in the digital identification database 112, and subsequently transmitted to authorized devices that perform verification of the digital identification 132 such as a detector device 140.

During a verification operation of the digital identification 132, the detector device 140 initially extracts line pattern data 212 within the digital identification 132. This can be accomplished using various types of optical recognition techniques. For instance, the detector device 140 can be configured to recognize designated line patterns that are included within the line pattern repository 108.

During a scan of the digital identification 132, the detector device 140 may identify the presence of the designated line patterns, and extract the identified line patterns as the extracted line pattern data 212. The extracted line pattern data 212 may specify, for example, a list of line patterns detected within the digital identifications, and a set of associated information for each detected line pattern. For example, the line pattern data 212 may specify a coordinate location within the digital identification where a particular line pattern was detected. In another example, the line pattern data 212 may specify the particular graphical element of the digital identification 132 that included the detected line pattern. In both of these examples, the associated information can be used to distinguish between true line pattern detection and false positive line pattern detection by the detector device 140.

The detector device 140 can then determine the secure customer information 212 assigned to the extracted line pattern data 210 using the information specified within the line pattern repository 108. For instance, the detector device 140 may cross-reference each of the detected line patterns indicated by the extracted line pattern data 210 with the line patterns that are specified within the line pattern repository 108 in order to determine the pieces of customer information assigned to each line pattern. As an example, referring back to FIG. 1A, the detection of the line pattern 106a within the digital identification 132 would enable the detector device 140 to obtain an address that is stored in the line pattern repository 108.

As described throughout, the detector device 140 can use both the extracted line pattern data 210 and the extracted secure customer information 212 to perform various types of verification operations of the digital identification 132. In one example, the detected line patterns within the extracted line pattern data 210 can be cross-referenced against a list of verified line patterns specified by the line pattern repository 108 in order to determine the authenticity of the digital identification 132. In this example, if the extracted line pattern data 210 does not include one or more of the verified line patterns, then detector device 140 may determine that there is a likelihood that the digital identification 132 is a counterfeit.

In another example, the arrangement of detected line patterns within the digital identification 132 can also be cross-referenced against a verified arrangement specified by the line pattern repository 108. In this example, the detector device 140 may determine that the digital identification 132 may be a counterfeit even if all of the verified line patterns are detected but in an incorrect arrangement. In each of these examples, the sensitivity of counterfeit detection can be adjusted based on the quality of the digital identification (e.g., image resolution), the scanning and/or recognition capabilities of the detector device, or other aspects that may impact the detection of the line patterns. In addition, the sensitivity of counterfeit detection may also be adjusted based on the type of verification operation performed.

In some implementations, the extracted secure customer information 212 can be used to authenticate a customer during an electronic transaction in which the customer provides the digital identification 132 as an authentication document. In such implementations, the extracted secure customer information 212 is used to verify a customer identity associated with the digital identification 132. For instance, because the line patterns encode customer information that is not displayed on the digital identification 132, detection of line patterns enables the detector device 140 to obtain additional customer information to verify a claimed customer identity of the digital identification 132.

As an example, during an online transaction, a customer provides the digital identification 132 for authenticating a claimed customer identity. In response, the detector device 140 obtains customer information displayed on digital identification 132 to identify the claimed customer identity. The detector device 140 scans the digital identification 132 to extract the line pattern data 210. The detector device 140 then identifies the secure customer information 212 assigned to the detected line patterns using the information specified by the line pattern repository 108. The detector device 140 finally verifies the claimed customer identity based on using the secure customer information 212 to verify the authenticity of the digital identification 132.

Figure 3:
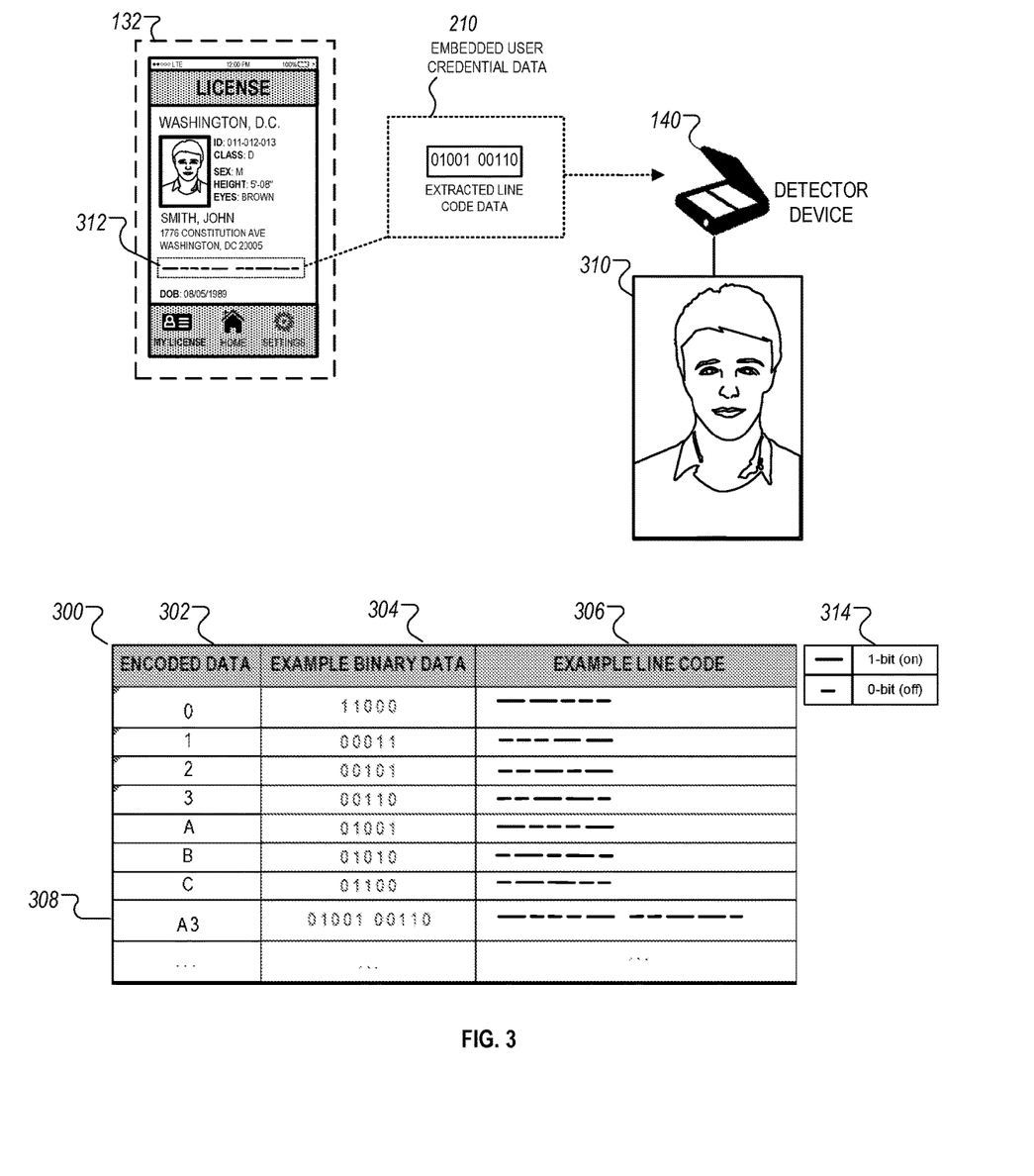
FIG. 3 illustrates a table including example encoded credential data and a facial template viewable by a detector device based on extraction of at least one encoded credential data.

FIG. 3 illustrates a table 300 including example encoded credential data and a facial template 310 viewable by detector device 140. Table 300 includes encoded data 302, binary data 304, and line code data 306. As shown, encoded data 302 is data generally viewable within digital identification 132. Table 300 includes multiple distinct encoded data items that collectively are referred to herein as encoded data 302. Encoded data 302 includes data such as decimal values and alphanumeric values. In some implementations, the decimal values and alphanumeric values can be combined, arranged, or generally used to indicate an individual's name, age, gender, date of birth, address, identification number, and identification class. Information indicated by the decimal values and alphanumeric values can correspond to identifying features or attributes of the individual (e.g., name, age, gender, date of birth, address, identification number, identification class, social security number, or other sensitive/personal information).

In some alternative implementations, digital identification 132, and a corresponding physical identification article (e.g., an identification card), can include embedded line pattern data that encodes a facial template of the cardholder or customer. In some instances, the decimal values and alphanumeric values can also be used to generate data 308 that corresponds to a particular facial template 310. As shown, the facial template associated with the embedded line pattern data can be consistent with, or substantially similar to, a photographic image of the customer/identification owner of digital identification 132. As described in more detail below, encoded data 308 (i.e., binary and line code data) can correspond to facial template 310.

In general, table 300 depicts example line code (line patterns/segments) that can be used to encode numerical values and alphabetical characters. In various implementations, the length of the lines depicted in the example line code 306 can vary depending on the type of information being embedded within an example identification article. With regard to static lines (non-line code) that are used to create an image/card data depicted on an identification item, the various portions of line code 306 will not be a part of the lines used to depict card data. Instead example line code 306 will be embedded as line code within a background pattern of the identification item.

Table 300 includes multiple distinct binary data code sequences that collectively are referred to herein as binary data 304. Binary data 304 includes computer readable code sequences that a processing unit of a computing device can receive and process to extract or obtain encoded data 302. As shown in table 300, unique binary code sequences can correspond to certain encoded data. For example, a binary sequence of "01001" can correspond to the letter "A," thus, various binary sequences can be arranged to indicate the name of the identification card owner. In another example, a binary sequence of "00110" can correspond to the numerical value "3," thus, one or more binary sequences corresponding to numerical values can be arranged to indicate the age of the identification card owner.

The binary data sequences shown in FIG. 3 represent example 5-bit binary data sequences. In some implementations, more or fewer bits can be used to represent a variety of different encoded data for a particular cardholder. For example, data 308 can include a 10-bit binary code sequence that corresponds to encoded data for generating facial template 310. In some implementations, more than 10-bits can be used to encode and generate facial template 310 or fewer than 10-bits can be used to encode and generate facial template 310.

Table 300 includes multiple distinctive line patterns that collectively are referred to herein as line code data 306. As described above, line patterns can be formed using line segment sequences in which certain line segments include different line lengths and/or thicknesses relative to other line segments. As shown in FIG. 3, legend 314 indicates that longer line segments correspond to a bit value of "1" while shorter line segments correspond to a bit value of "0." Moreover, spacing between line segment pairs can vary as well. For example, for line patterns that include multiple line segment pairs, the spacing between line segments of a first line segment pair can be different from the spacing between line segments of a second line segment pair. Spacing between line segments can indicate a gap or width that ranges from 20, 30, or 40 microns. In some implementations, the gap or width can be greater than 40 microns.

As shown in table 300, unique line code data can correspond to certain encoded cardholder data. For example, a line pattern that includes " — — —— — —— " can correspond to a decimal value of 2, while a line pattern that includes " — — —— —— — " can correspond to a decimal value of 3. Hence, in some implementations, the aforementioned line segments can be scanned and decoded to indicate the age (e.g., 23) of the identification card owner. In some implementations, line patterns shown in FIG. 3 represent only a portion of longer line patterns that may, for example, extend horizontally from left to right at various sections of digital identification 132 or is corresponding physical card equivalent.

In some implementations, longer or shorter line pattern portions can be used to represent a variety of different encoded data for a particular cardholder. For example, data 308 can include a line pattern portion that corresponds to encoded data for generating facial template 310. As shown, in some implementations, a longer line pattern can be used to encode and generate facial template 310 relative to the line pattern portions for other encoded data associated with digital identification 132.

In some implementations, physical or digital identification articles can include line patterns with line segments that have a length of approximately 50-microns. In other implementations, line segment length can be greater than or less than 50-microns. In general, the line segment lengths and/or gaps or width spacing between the line segments can be varied as needed depending on the amount of data that is to be encoded by a particular line pattern.

In some implementations, line patterns with line segments that have a particular length can be combined with related sets of offset print lines. The related offset print lines can have a length or thickness that corresponds to the length or thickness of the line patterns used to encode certain cardholder data. In some instances, offset lines of corresponding length and thickness can be preprinted in a background image of an example identification article.

In some implementations, line patterns and line segments are used to encode data on a physical identification card (or digital identification card) with background lines that are preprinted (or variable printed images) for engraving data based on LASINK laser etching/printing technology. The preprinted background lines can have multiple iterations of colored lines that are grouped using RGB or CMY color models as well as various other color combinations and laser printing technologies for generating preprinted background lines. For example, cyan, magenta, yellow (CMY) lines can be preprinted on a background of a physical ID card and a key (black) can be used to create line patterns by masking certain colored CMY lines. Laser etching, or other related laser printing technology, can be used to create line segments of a line patterns that encode various types of data related to the card holder.

In some implementations, line segments used to encode certain sensitive information can be disposed or placed within an identification article in an alternating pattern relative to other print lines. Example placement patterns can include every third print line viewable on the identification article being composed of line pattern segments that have a length or thickness corresponding to, or consistent with, the offset print lines. In alternative implementations, to enhance viewing clarity and improve authentication processes, line pattern segments can have a slightly larger length or thickness relative to preprinted background lines. Line pattern segments can be also printed or otherwise disposed in the identification article using a variety of colors to also aid in enhancing viewing clarity.

As described above, in some implementations, detector device 140 can be configured to scan digital identification 132 and the line patterns embedded within the digital identification 132 to extract one or more secure user customer information. In FIG. 3, detector device 140 scans digital identification 132 to extract the line pattern data 210. As shown, digital identification 132 can include an example line pattern 312 embedded with the digital identification 132 (or a physical card). In some instances, encoded line data can be decoded, in part, by scanning or capturing an image of an example identification article (e.g., digital identification 132) with a computing device such as a smartphone, a digital camera, or a laptop computing device.

As shown in FIG. 3, line pattern 312 can correspond to encoded data that is scanned and used to generate an example binary data sequence that includes "01001 00110" (or more bits, e.g., 1-bit to 1,000 bits). The example binary data sequence can then be processed by a processing unit of detector device 140 to generate an image of the card owner in the form of facial template 310 (viewable on a display of device 140). Thus, line patterns embedded within an identification article can be scanned to extract and process encoded data to generate facial template 310 to provide enhanced identification verification.

Figure 4:
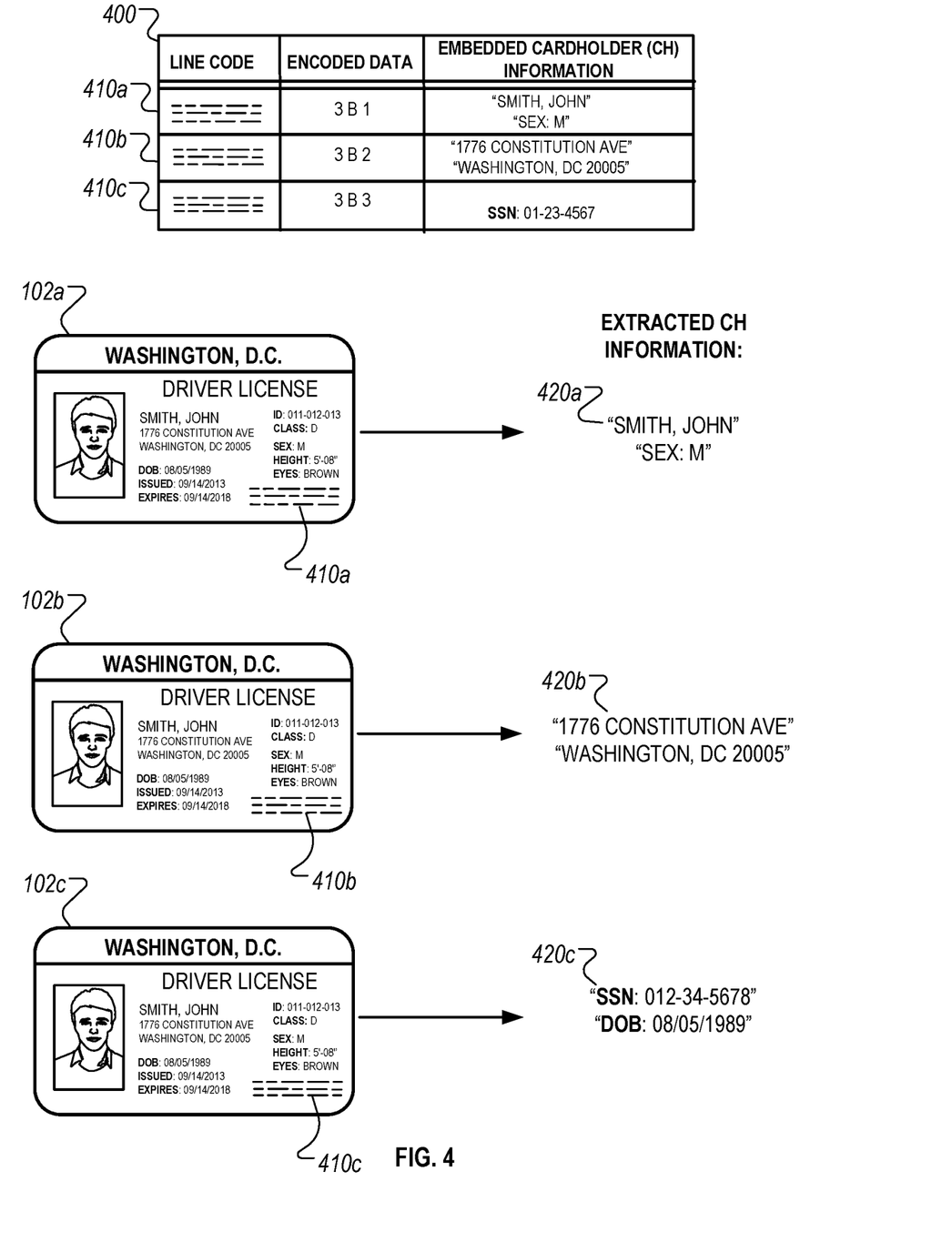
FIG. 4 illustrates example decoded credential data that can be extracted from an example set of encoded data.

FIG. 4 illustrates example decoded/detected credential data that can be extracted from example encoded line pattern data. FIG. 4 includes table 400, identification card/article 102a/b/c, line pattern features 410a/b/c and extracted data 420a/b/c. In some implementations, line pattern feature 410a can be extracted or interpreted using detector device 140. As indicated above, detector device 140 can include a screen configured to display, to a user, the encoded data that corresponds to line pattern feature 410a. In one implementation, upon extraction or interpretation of line code associated with feature 410a, a user of detector device 140 can view, on the display screen of device 140, embedded cardholder information corresponding to the name and/or gender of the cardholder. Additionally, embedded cardholder information corresponding to address information and social security number can be displayed by device 140 in response to extraction or interpretation of line code associated respectively with features 410b and 410c.

As shown, in one implementation, detector device 140 can scan identification article 102a to extract/interpret encoded data 420a associated with line pattern feature 410a. The interpreted encoded data 420a can include the name of the cardholder and the gender of the cardholder. In another implementation, detector device 140 scans identification article 102b to extract or interpret encoded data associated with line pattern feature 410b. The extracted encoded data 420b can include the first line of the cardholder's address and the second line of the cardholder's address. In yet another implementation, detector device 140 scans identification article 102c to extract/interpret encoded data associated with line pattern feature 410c. The extracted/interpreted encoded data 420c can include the cardholder's social security number and/or the cardholder's date of birth.

In some implementations, identification cards (e.g., physical cards) having a primary photographic image can also include a partial density ghost feature (not shown) in an area of the card that is distinct from the area having the photographic image of the card owner. In an aspect of this implementation, a card designer can include an outline (not shown) around the example ghost feature. The, outline can be composed of line patterns including multiple line segments that can be used to encode sensitive customer/cardholder data.

In another aspect, the outline can include an irregular outline shape or design. In yet another aspect, the outline can include a square shape, a rectangular shape, a circular shape, a triangular shape, or any other shaped desired by the card designer. In the various aspects discussed above, the shape of the outline can be constructed with line patterns including line segments that are uniquely arranged to embed and encode data within an example identification card such as card 102a/b/c.

In general, line patterns embedded within an example physical or digital identification article (e.g., card or displayed image on a device) can be formed using a series of lines that create the appearance of a wave going across the face of the identification article. For physical cards, ink jet printers, ultra-violet (UV) laser printers, YAG laser printers, or any other suitable print device can be used to produce the embedded line patterns described in this specification.

In some implementations, printer devices can be configured such that an offset print pattern can include spacing between lines used to generate readable larger print information typically viewable on an identification article (e.g., card owner name, address, data of birth (DOB), etc.). The spacing between the lines used to generate readable print can be sufficient such that embedded line patterns that encode certain formation can be sized small enough to fit between the line spaces created by the offset print pattern.

In some examples, with regard to physical identification cards, an identification card designer can utilize a YAG laser to embed one or more lines between, for example, the colored or non-colored lines associated with the standard text/print of an identification card. This example card can already include a photograph of the card owner as well as the card owner's demographic information. Embedded line pattern data would then be included on top of, for example, a preprinted background information associated with the identification article.

When embedded within the standard text/print information of the identification card, the line segments of the encoded line pattern data can be interspersed with and cooperate with the standard text/print line data to create the appearance of a wave pattern. Some identification cards can be printed using dies that have certain see-through attributes. Thus, in some implementations, the embedded line pattern data may be viewable on the background of an example physical identification card.

Figure 5:
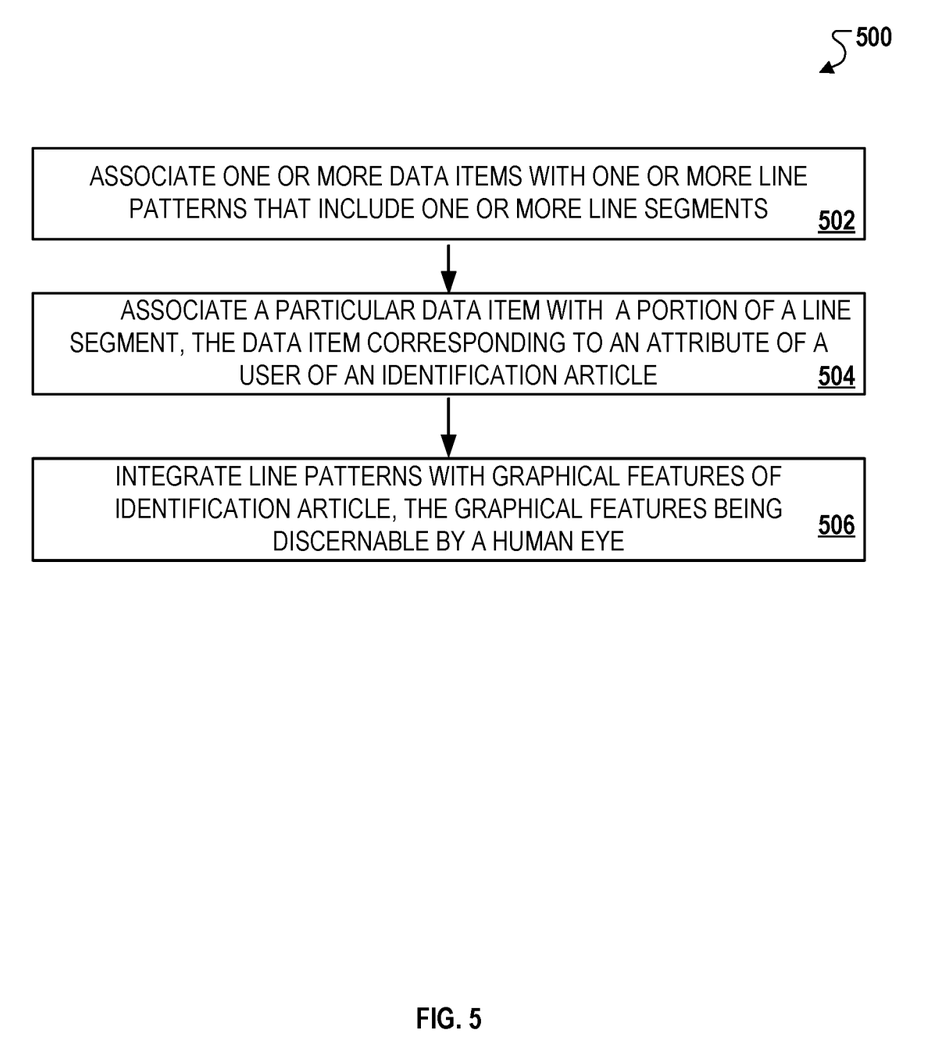
FIG. 5 illustrates an example process for verifying user identification based on data extracted from embedded line patterns of an identification article.

FIG. 5 illustrates an example process for producing an identification document or article as well as for verifying user identification based on data extracted or interpreted from embedded line patterns of an identification article. At block 502, process 500 includes associating, by an example computing system, one or more data items with one or more line patterns. As discussed above, the line patterns can include one or more line segments. The data items can include, for example, the name, address, DOB, or photographic image of an owner of the identification article (e.g., digital/physical identification card).

As indicated above, the technology described in this specification can include an encoding and production system and a decoding/detecting and authentication system. The encoding and production system can operate based on inclusion of the following steps to generate the digitally encoded line patterns and embed the line patterns into the background of an example identification article. A process step (502) can include the system receiving digital information such as, for example, a person's name, date of birth, age, identification number, personal identification information, issuing agency information to be embedded. The system can use a predefined line segment encoding component to generate line segments from the received information. For example, when at least 5-bits are used to encode the decimal/integer numbers, the number '1' can be encoded as 5 line segments, with 3 short lines (each corresponding to a bit-0) and 2 longer lines (each corresponding to a bit-1).

At block 504, process 500 includes associating, by the computing system, a particular data item with at least a portion of a line segment, the particular data item corresponding to an attribute of a user of the identification article. In some implementations, the particular data item can a photographic image of the user of the identification article. Moreover, as indicated above, the user of the identification article can be the cardholder or card-owner of the identification article.

In another step, a user of the system can specify the image region in the identification document/article in which the encoded line patterns are to be embedded. In some implementations, the line patterns can be added to a digital image and then printed to the identification document or used as a separate layer and printed to the identification document directly, using a printer or a laser engraving device or any identification card fabricating device.

At block 506, process 500 includes integrating, by the computing system, the one or more line patterns with graphical features of the identification article, the graphical features being discernable by a human eye. In some implementations, the graphical features include line data segments that are used to form the readable larger print information typically viewable on an identification article (e.g., card owner name, address, data of birth, etc.). In general, integrating the line patterns with the graphical features of the identification article includes affixing the line patterns to a background portion of the identification article.

Figure 6:
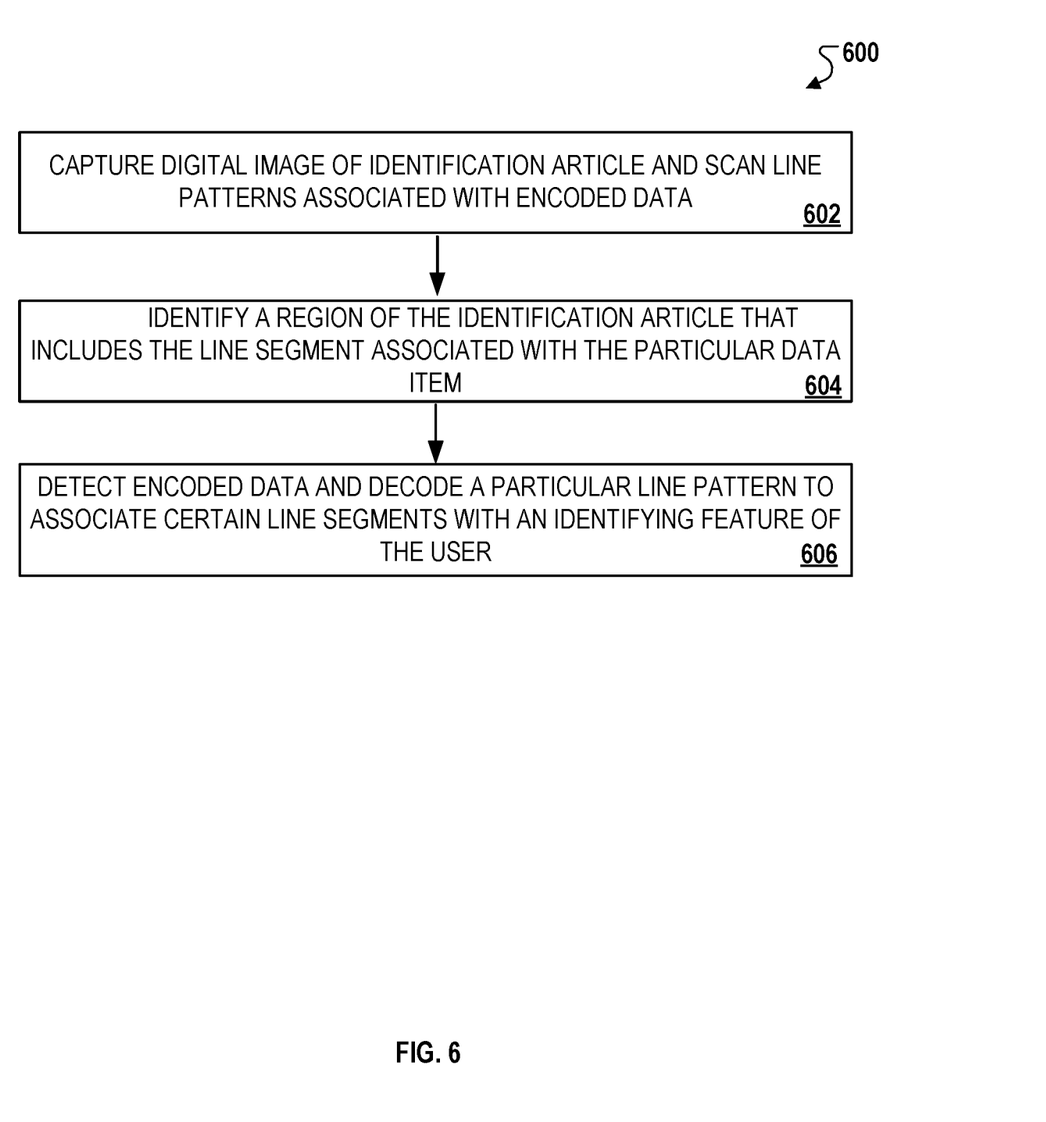
FIG. 6 illustrates another example process for verifying user identification based on data extracted from embedded line patterns of an identification article.

FIG. 6 illustrates another example process for verifying user identification based on data extracted or interpreted from embedded line patterns of an identification article. At block 602, process 600 includes identifying a region of an identification article that includes the line segments of line patterns that are associated with a particular data item. For example, a line segment can be associated with a data item such as the age, name or address of the individual that owns the identification article. At block 604, process 600 includes capturing a digital image of the identification article and scanning the digital image for line patterns affixed to the identification article that are associated with the encoded data. In some implementations, the digital image is captured by an example mobile computing device (or other computing devices) such as a smartphone. Moreover, the mobile computing device can include program code software instructions for executing an identity verification application that decodes or interprets the line pattern segments to generate/indicate a particular data item or identifying feature of the user.

At block 606 process 600 includes detecting the encoded data and decoding particular line patterns to associate certain line segments with an identifying feature of the user (e.g., the cardholder). In some implementations, the identifying feature of the user corresponds to at least one data item and the identifying feature can be a photographic image of the face of the user (e.g., owner of the identification article), the name of the user, the address of the user, etc.

In some alternate implementations, the decoding and authentication system can operate based on inclusion of the following steps (related to process 600) to capture a digital image of the identification document and decode or interpret the security information embedded in the line patterns to verify, validate, and/or authenticate the identity of the owner or user of the identification document as well as the identification document/article itself. A first step can include capturing a digital image of the identification document using a scanner, a camera, a mobile device, or any related image capture device (602). Another step can include identification of a particular region of the identification article and extraction of line segments from the image area that includes embedded security information (604). Next, the system can be configured to decode the security information from the line segments (606). For example, the system can include (e.g., stored in memory of the system) a table similar to table 300 to obtain data items (or decimal/integer numerical values) encoded in the line segments. The system can then use the decoded information to validate and/or verify the authenticity of the identification document.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An identification article comprising:
  a photographic image depicting an individual associated with the identification article; and
  a graphical element comprising one or more line patterns, each line pattern including one more or line segments and being embedded within a background pattern of the identification article,
  wherein at least a portion of a line segment of a line pattern corresponding to encoded binary data, the encoded binary data representing information that is descriptive of one or more attributes of an individual, and the encoded binary data being configured for interpretation by a processing unit of a computing device, and
  wherein a relative length of at least two distinct line segments of a line pattern differ based on a type of information that is represented by the encoded binary data.

2. The identification article of claim 1, wherein:
  the identification article is one of a government-issued identification card, a company-issued identification card, or a customer card issued by a company or government agency; and
  the identification article is a physical identification card or a digital identification item that is viewable on a display of a computing device.

3. The identification article of claim 1, wherein:
  i) a first line segment of a particular line pattern has a first length or first length that corresponds to a bit value of "1" for encoding the binary data; and
  ii) a second line segment of the particular line pattern has a second length or second length that corresponds to a bit value of "0" for encoding the binary data.

4. The identification article of claim 1, wherein the identification article includes offset print lines and the one or more line patterns are arranged in an alternating pattern relative to at least one offset print line, and at least one line segment of a particular line pattern has a line length of at least 20-micron.

5. The identification article of claim 1, wherein the information that is descriptive of one or more attributes of the individual includes one or more of: a social security number of the individual; a height of the individual; a gender of the individual; a name of the individual; a date of birth of the individual; an address of the individual; or a facial template of the individual.

6. An identification article comprising:
  a photographic image depicting an individual associated with the identification article; and
  a graphical element comprising one or more line patterns, each line pattern including one more or line segments and being embedded within a background pattern of the identification article,
  wherein at least a portion of a line segment of a line pattern corresponding to encoded binary data, the encoded binary data representing information that is descriptive of one or more attributes of an individual, and the encoded binary data being configured for interpretation by a processing unit of a computing device, and
  wherein:
  i) a first line pattern corresponding to encoded binary data representing a first type of information that is descriptive of a first attribute of the individual; and
  ii) at least a second line pattern corresponding to encoded binary data representing a second type of information that is descriptive of a second attribute of the individual.

7. The identification article of claim 6, wherein:
i) the first attribute of the individual is a facial feature of the individual and the first type of information is a facial template represented by the encoded binary data corresponding to the first line pattern; and
ii) the second attribute of the individual is an identifying feature of the individual and the second type of information is personally identifiable information represented by the encoded binary data corresponding to the first line pattern.

8. A computer-implemented method, comprising:
identifying, by a computing system, one or more areas of an identification article, the identification article comprising one or more line patterns, each line pattern including one or more line segments and being embedded within a background pattern of the identification article;
obtaining, by the computing system, image data for at least one area of the identification article, wherein the at least one area comprises a particular line pattern, the particular line pattern including a subset of line segments corresponding to encoded data about an individual, wherein a relative length of at least two distinct line segments of a line pattern differ based on a type of information that is represented by the encoded data; and
in response to obtaining, determining, by the computing system and based on analysis of the image data, information that is encoded by the subset of line segments, the information being descriptive of one or more attributes of an individual.

9. The method of claim 8, wherein the information that is descriptive of the one or more attributes of the individual also indicates an identifying feature of a user of the identification article, and wherein the individual corresponds to the user of the identification article.

10. The method of claim 9, wherein:
i) the particular line pattern is associated with one or more data items, each data item comprising encoded binary data, and
ii) the identifying feature relates to a facial feature of the individual and corresponds to at least one data item of the one or more data items.

11. The method of claim 10, wherein the identifying feature of the individual is a photographic image of a face of a user of the identification article.

12. The method of claim 10, wherein the information that is descriptive of one or more attributes of the individual includes one or more of: a social security number of the individual; a height of the individual; a gender of the individual; a name of the individual; a date of birth of the individual; an address of the individual; or a facial template of the individual.

13. The method of claim 10, wherein determining comprises:
decoding, by the computing system, encoded binary data represented at least by the subset of line segments, each line segment of the subset of line segments indicating a particular binary bit value when the computing system decodes the encoded binary data.

14. The method of claim 8, further comprising:
verifying, by the computing system, that the information encoded by the subset of line segments is descriptive of one or more attributes of a person using the identification article; and
validating, by the computing system, authenticity of the identification article based on the information that is encoded by the subset of line segments.

15. The method of claim 8, wherein the identification article is one of a physical identification card or a digital identification item that is viewable on a display screen of a computing device.

16. A non-transitory computer-readable storage medium including instructions that, when executed by one or more processors, cause the one or more processors to perform operations comprising:
identifying one or more areas of an identification article, the identification article comprising one or more line patterns, each line pattern including one or more line segments and being embedded within a background pattern of the identification article;
obtaining image data for at least one area of the identification article, wherein the at least one area comprises a particular line pattern, the particular line pattern including a subset of line segments corresponding to encoded data about an individual; and
in response to obtaining, determining, based on analysis of the image data, information that is encoded by the subset of line segments, the information being descriptive of one or more attributes of an individual.

17. The non-transitory computer-readable storage medium of claim 16, wherein the information that is descriptive of the one or more attributes of the individual also indicates an identifying feature of a user of the identification article, and wherein the individual corresponds to the user of the identification article.

18. The non-transitory computer-readable storage medium of claim 17, wherein:
i) the particular line pattern is associated with one or more data items, each data item comprising encoded binary data, and
ii) the identifying feature relates to a facial feature of the individual and corresponds to at least one data item of the one or more data items.

19. The non-transitory computer-readable storage medium of claim 16, further comprising:
verifying that the information encoded by the subset of line segments is descriptive of one or more attributes of a person using the identification article; and
validating authenticity of the identification article based on the information that is encoded by the subset of line segments.

20. The identification article of claim 16, wherein:
a relative length of at least two distinct line segments of a line pattern differ based on a type of information that is represented by the encoded data; and
the identification article is a social security card, a passport, a birth certificate, or a government-issued identification card, or company-issued identification card.

* * * * *